Dec. 29, 1942.  G. A. LYON  2,306,631
WHEEL COVER STRUCTURE
Filed May 7, 1941
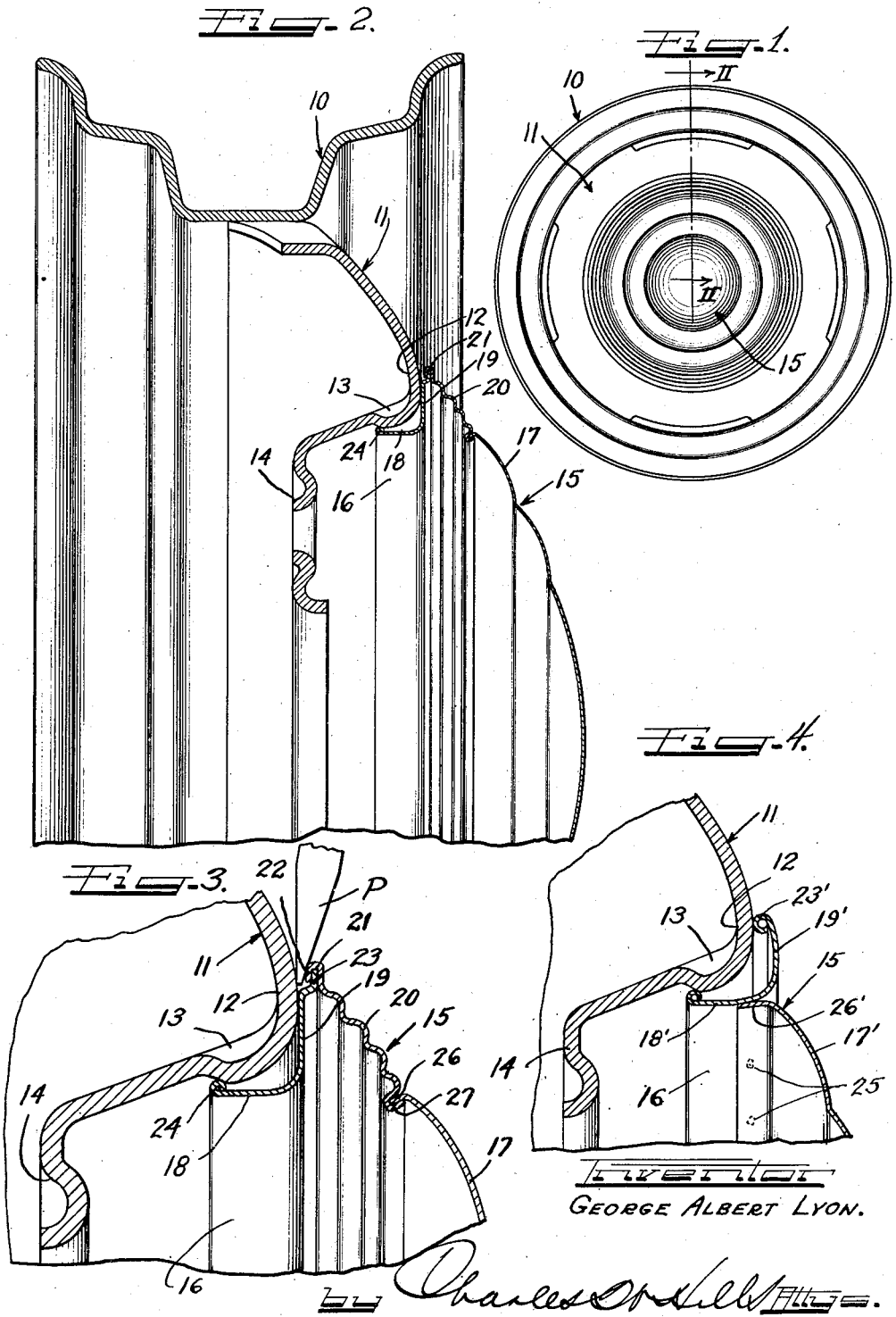
Inventor
GEORGE ALBERT LYON.

Patented Dec. 29, 1942

2,306,631

UNITED STATES PATENT OFFICE 2,306,631

WHEEL COVER STRUCTURE

George Albert Lyon, Allenhurst, N. J.

Application May 7, 1941, Serial No. 392,223

4 Claims. (Cl. 301—37)

This invention relates to wheels, and more particularly to a novel wheel cover or hub cap structure therefor.

An object of this invention is to provide a wheel cover or hub cap which is more economical to manufacture and which is readily removable from the cooperating spider of a wheel.

Another object of this invention is to provide a wheel cover or hub cap which is of such mechanical structure that the majority of the material thereof may be made of relatively inexpensive low carbon steel and only a small portion of the cap need be made of more expensive steel such as stainless steel in order still to provide the cover with an enhanced and ornamented appearance.

A still further object of the invention is to provide a multi-part wheel cover or hub cap wherein the parts are interconnected in a novel way and wherein the outermost parts have their edges so locked together as to provide the cover at its outer edge with a laterally offset flat portion between which and the spider of the wheel a pry-off tool may be inserted for facilitating the removal of the cover or cap from the wheel.

In accordance with the general features of this invention, there is provided in a wheel structure including a wheel having a tire rim and a central spider having a curved outer nose portion equipped with cover retaining protuberance means, a wheel cover for cooperation with the spider comprising a ring part of substantially L-shaped cross section including one leg telescoping the nose portion and having a continuous turned inner edge flexible in its entirety into a snap-on retaining engagement with the protuberance means, a second leg extending radially outwardly to overlie the outer face of the nose for concealing the protuberance means, and a crown part positioned over the central hole in the ring part and having its outer margin formed for connection to the ring part.

One feature of the invention relates to the provision in the foregoing structure of an annular band for connecting the crown part to the ring part and having an inner edge interlocked with the outer margin of the crown part and an outer edge interlocked with the outer edge of the ring part; the interlocked connection between these outer edges being in the form of an offset flattened lockseam providing a space between the seam and the spider of the wheel for the insertion of a pry-off tool.

Other objects and features of this invention will more fully appear from the following detailed description taken in connection with the accompanying drawing which illustrates several embodiments thereof, and in which:

Figure 1 is a side view of a wheel having a cover embodying the features of this invention;

Figure 2 is an enlarged fragmentary cross sectional view taken on the line II—II of Figure 1 looking in the direction indicated by the arrows;

Figure 3 is an enlarged cross sectional view corresponding to the central portion of Figure 2 showing the interrelation of my novel cover or hub cap with the spider of the wheel, as well as showing how a pry-off tool may be inserted between the outer edge of the cover and the spider; and Figure 4 is a sectional view similar to Figure 3 showing a modified form of cover.

As shown in the drawing:

The reference character 10 designates generally a conventional drop center type of tire rim connected in the usual way to a central wheel spider or body part 11. This spider has a bulged convex-concave nose portion 12 in which there is provided radially inwardly extending protuberances for retaining cooperation with the hub cap or wheel cover designated generally by the reference character 15. The spider 11 is also provided with an axially inwardly offset vertical flange portion 14 adapted to be bolted on an axle part in the usual way.

The hub cap designated generally by the reference character 15, as well as the modified form of cap 15' shown in Figure 4, may be made in accordance with the method disclosed in my copending application Serial No. 392,222, filed May 7, 1941.

It should be noted that, while in both forms of the invention I have shown the wheel cover in the form of a hub cap, the invention is not to be thus limited, since the cover could also be in the form of a larger disk extending out closer to the tire rim of the wheel.

In the first form of the invention, the wheel cover 15 includes three parts, namely, a ring part 16, a central crown part 17, and an interconnecting annular band 20.

As best shown in Figure 3, the ring part 16 in reality comprises the skirt of the hub cap and is of an L-shaped cross section. It includes two legs 18 and 19, leg 18 extending axially of the wheel and telescoping the nose portion of the spider, and the leg 19 extending radially outwardly over the nose portion 12 for concealing the retaining protuberances or bumps 13.

The inner edge of the legs 16 is turned as indicated at 24 so as to provide the cover with a continuous flexible inner edge adapted to be snapped over and into retaining cooperation with the retaining bumps 13 on the nose portion 12 of the wheel.

The central crown part 17 is of convex-concave cross sectional shape and, as disclosed in my copending method application noted above, may be formed from the central portion of the blank from which the ring part 16 is fabricated. The material from which these two parts 16 and 17 are formed is preferably of steel sheet, and I have obtained excellent results from the use of relatively low carbon steel such as .25 to .30 carbon steel. I have, in the fabricating of these parts from such metal sheet, used annealed steel so as to enable a relatively deep draw in the formation of the parts 17 from the central stock taken from the center of the ring 16.

In order to provide the ring with an ornamented or lustrous appearance, I have found it desirable to make the annular corrugated band part 20 of steel such as stainless steel. This enables the ensuing cover to have an ornamented or trimmed appearance, where, for example, the outer band part 20 may be lustrous and the central crown part 17 may be finished in color. This also provides a more economical construction in that it is not necessary to make the entire cover or hub cap of stainless steel which is considerably more expensive than annealed low carbon steel.

The central crown part 17 has its outer edge turned axially rearwardly as shown at 26 and is interlocked or lock-seamed with the inner edge 27 of the annular band 20.

It will be noted that the outer edge 26 of the crown part 17 is in reality in telescoping cooperation with the other part 20 of the cover so that it is firmly interlocked therewith.

The outer edge 21 of the band 20 is folded or turned radially inwardly over a flattened offset portion 23 on the outer edge of the vertical leg 19 of the ring part 16. This enables an interlocked or lockseamed connection between the outer edges of the two parts 20 and 16 which is offset axially outwardly from the nose portion 12 of the spider 11.

The advantage of the above described feature of providing a laterally offset lockseam between the outer edges of the leg 19 and the band 20 is that it provides a space between the plane of the leg 19 and the turned edge 22 of the band 20 in which a pry-off tool P can be inserted for the purpose of prying the cover or hub cap out of retaining cooperation with the protuberance means or bumps 13.

In Figure 4, I have illustrated a modified form of hub cap or wheel cover applied to the spider 11 of the same wheel as is shown in Figure 2. For this reason, in both Figures 3 and 4, I have used the same reference numerals to designate like parts of the wheel.

The hub cap 15' in this form of the invention comprises two parts, namely, a ring part 16' and a crown or central part 17'. The ring part 16' is of an L-shaped cross section and includes an axially extending leg 18' in telescoping and snap-on cooperation with the retaining protuberances 13 on the wheel spider. The ring part 16' also includes a vertical leg 19' extending radially outwardly and terminating in a turned edge 23' adapted to overlie an outer face of the nose portion 12 of the spider for the purpose of concealing the retaining bumps 13.

The central part 17' is of a convex-concave cross sectional configuration and includes a rearwardly turned outer edge 26' telescoping the ring part 16' and fastened to the leg 18' by any suitable means, such, for example, as welds 25'. In this form of the invention, both of the parts may be made from the same material. Also, the part 17' may be formed from the central waste stock removed from the center of the blank from which the ring part 16' is formed.

It should, of course, be understood that, while I have described my novel hub cap as best made of steel, other suitable material, such, for example, as plastic, might be used in the fabrication of the same.

In prying off the hub cap 16' shown in Figure 4, a suitable pry-off tool, such, for example, as a screw driver may be inserted under the turned edge 23' for the purpose of forcibly ejecting the hub cap out of retained cooperation with the protuberances or bumps 13.

I claim as my invention:

1. In a wheel structure including a wheel having a tire rim and a central spider having a curved convex central nose portion provided with cover retaining protuberance means, a wheel cover for cooperation with said spider comprising a ring part of substantially L-shaped cross section including one leg telescoping said nose portion and having a continuous turned inner edge flexible in its entirety into a snap-on retaining engagement with said protuberance means, a second leg extending radially outwardly and overlying an outer face of said nose portion to conceal said protuberance means, a central crown part positioned over the central hole in said ring part and having its outer margin formed for connection to said ring part, and an annular band having an inner edge interlocked with said outer margin of said crown part and an outer edge interlocked with the outer edge of said ring part, said annular band extending from the outer edge of said ring part axially inwardly over said second leg and being interlocked with said crown part directly over and opposite said telescoping leg.

2. In a wheel structure including a wheel having a tire rim and a central spider having a curved convex central nose portion provided with cover retaining protuberance means, a wheel cover for cooperation with said spider comprising a ring part of substantially L-shaped cross section including one leg telescoping said nose portion and having a continuous turned inner edge flexible in its entirety into a snap-on retaining engagement with said protuberance means, a second leg extending radially outwardly and overlying an outer face of said nose portion to conceal said protuberance means, a central crown part positioned over the central hole in said ring part, and an annular band for connecting said crown part to said ring part having an inner edge interlocked with said outer margin of said crown part and an outer edge interlocked with the outer edge of said ring part, said outer edge of said ring part being slightly offset outwardly and flattened, and said outer edge of said annular band being lockseamed therewith in such a manner that the lockseam is offset axially outwardly from said second leg to provide a space for the insertion of a pry-off tool between the outer lockseamed edge of the cover and the nose portion of the wheel.

3. In a wheel structure including a wheel having a tire rim and a central spider having a curved convex central nose portion provided with cover retaining protuberance means, a wheel cover for cooperation with said spider comprising a ring part of substantially L-shaped cross section including one leg telescoping said nose portion and having a continuous turned inner edge flexible in its entirety into a snap-on retaining engagement with said protuberance means, a second leg extending radially outwardly and overlying an outer face of said nose portion to conceal said protuberance means, and an outer part over said ring part having its outer edge lockseamed to the outer edge of said second leg of said ring part, the lockseam connection between said edges being flattened and laterally offset outwardly from the plane of said second leg so as to provide a space between the lockseam and the nose portion of the wheel for the insertion of a pry-off tool.

4. As an article of manufacture, a wheel cover for retaining cooperation with the spider of a wheel comprising a ring part of substantially L-shaped cross section including one leg extending axially rearward therefrom for telescoping cooperation with the spider and which leg is provided with a continuous turned inner edge flexible in its entirety into a snap-on retaining engagement with the spider, a second leg extending radially outwardly from said first leg for overlying the spider, a central crown part positioned over the central hole in said ring part, and an annular band for connecting said crown part to said ring part having an inner edge interlocked with said outer margin of said crown part and an outer edge interlocked with the outer edge of said ring part, said connection between the outer edges of the band and ring part comprising a flattened lockseam offset axially outwardly from said second leg to provide a space for the insertion of a pry-off tool between said lockseam of the cover and the spider of the wheel.

GEORGE ALBERT LYON.